(No Model.)
A. W. PARMELEE.
COAT AND HAT HOOK.
No. 433,182. Patented July 29, 1890.
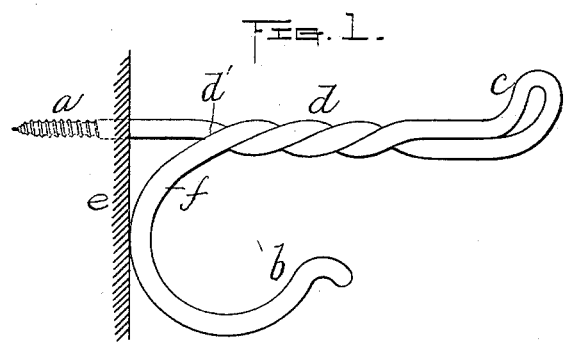
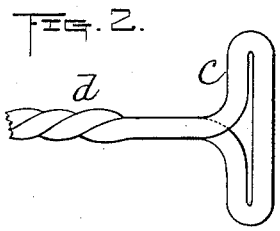
Witnesses:
Walter B. Nourse,
C. Forrest Wesson,
Inventor:
Arthur W. Parmelee.
By A. A. Barker Att'y.

UNITED STATES PATENT OFFICE.

ARTHUR W. PARMELEE, OF WORCESTER, MASSACHUSETTS.

COAT AND HAT HOOK.

SPECIFICATION forming part of Letters Patent No. 433,182, dated July 29, 1890.

Application filed December 30, 1889. Serial No. 335,392. (No model.)

*To all whom it may concern:*

Be it known that I, ARTHUR W. PARMELEE, of the city and county of Worcester, and State of Massachusetts, have invented certain new and useful Improvements in Coat and Hat Hooks; and I do hereby declare that the following is a full, clear, and exact description thereof, reference being had to the accompanying drawings, forming a part of this specification, and in which—

Figure 1 represents a side view of my improved hook; and Fig. 2 shows in plan view a modification in the construction of the outer end of the main hook, hereinafter more fully described.

My invention relates to hooks made from wire, and more especially to double hooks.

In making long, slender, wire hooks from a single piece of wire projecting straight out from the wall the difficulty has been to produce a hook that shall be sufficiently stiff and firm to stand the strain that may come upon it without the expense necessitated by the use of supporting-bases, or of other stiffening and strengthening devices riveted to or otherwise fastened to the hook. To overcome these objections and to produce a strong, simple, and effective hook, easily applied and manufactured at small expense, is the purpose of my invention.

Said invention consists in bending and intertwisting the wire of the hook so as to form a strong rigid brace from the wall to the horizontal arm or shank to support the main or upper hook, as hereinafter more fully set forth.

To enable others skilled in the art to which my invention appertains to better understand the nature and purpose thereof, I will now proceed to describe it more in detail.

The hook is made from a single piece of wire having the screw end $a$ for fastening said hook in position, and bent as follows: Said wire extends straight out from the screw end $a$ the distance that the hook is to project. It is then bent upward or otherwise to form the main hook $c$, then returned upon itself part way to a point $d'$ at a considerable distance from the screw end, then down and back at about right angles, preferably in a curved line, to form the brace $f$, and terminating at the bottom in the lower hook $b$. The doubled portion of the horizontal arm or shank $d$ is finally intertwisted for a short distance in front of the point of separation $d'$ for the purpose of holding the upper end of said brace $f$ against longitudinal movement on the arm or shank $d$. It is obvious that by thus constructing a double hook, although the lower hook is free and unattached to the wall, a strong rigid brace is produced from said wall to the main arm or shank to support the upper hook. A separate device for fastening the lower hook to the wall or to said arm or shank being by said construction unnecessary in producing the desired result, effects a corresponding reduction in the cost of making the hook.

I reserve the right to make both the upper and lower hooks $c$ and $b$ of any desired shape.

In Fig. 2 the main hook is shown with an arm extended out laterally to either side, which form is more especially adapted as a coat-hanger in practice, the same presenting a broad surface for the neck of the garment, and thus rendering the same less liable to injury.

I am aware that it is not broadly new to interwist certain portions of a coat and hat hook, or to form a screw on one end of the wire for attaching said hook in position, and I therefore limit my invention to the construction herein shown and specified, for the purpose set forth.

What I claim as new, and desire to secure by Letters Patent, is—

A coat and hat hook made from a single piece of wire having a screw-thread at one end and bent at the middle to form the upper hook $c$, then doubled upon itself part way toward the screw end and intertwisted at the end of said doubled portion for a short distance, then extended downwardly and rearwardly from said twisted portion and curved outwardly to form the bottom hook $b$, the terminal end of said wire forming said bottom hook, and the part $f$, which extends down from the twisted part being of a single strand of wire and forming a firm rigid brace, substantially as set forth.

ARTHUR W. PARMELEE.

Witnesses:
  A. A. BARKER,
  W. B. NOURSE.